(12) United States Patent
Eijsbouts et al.

(10) Patent No.: US 6,540,908 B1
(45) Date of Patent: Apr. 1, 2003

(54) PROCESS FOR SULFIDING A HYDROTREATING CATALYST COMPRISING AN ORGANIC COMPOUND COMPRISING N AND CARBONYL

(75) Inventors: Sonja Eijsbouts, Nieuwkuijk (NL); Marcel Adriaan Jansen, Hoofddorp (NL)

(73) Assignee: Akzo Nobel N.V. (NL)

( * ) Notice: Subject to any disclaimer, the term of this patent is extended or adjusted under 35 U.S.C. 154(b) by 0 days.

(21) Appl. No.: 09/540,402

(22) Filed: Mar. 31, 2000

Related U.S. Application Data
(60) Provisional application No. 60/128,256, filed on Apr. 8, 1999.

(30) Foreign Application Priority Data

Apr. 8, 1999 (EP) .............................................. 99201051

(51) Int. Cl.⁷ ........................... C10G 45/04; B01J 27/04
(52) U.S. Cl. .................. 208/216 R; 208/213; 208/217; 502/167; 502/200; 502/219; 502/220; 502/221; 502/222; 502/439; 502/509; 502/510; 502/511
(58) Field of Search .............................. 208/216 R, 217, 208/213; 502/219, 220, 221, 222, 200, 167, 439, 509, 510, 511

(56) References Cited

U.S. PATENT DOCUMENTS

| | | | | |
|---|---|---|---|---|
| 4,012,340 A | * | 3/1977 | Morimoto | 252/465 |
| 4,148,750 A | * | 4/1979 | Pine | 208/111.35 |
| 5,059,731 A | | 10/1991 | Berrebi | 585/259 |
| 5,232,888 A | * | 8/1993 | Kamo | 502/170 |
| 5,525,211 A | * | 6/1996 | Sudhaker et al. | 208/216 R |
| 5,565,091 A | * | 10/1996 | Iino et al. | 208/216 R |
| 5,906,731 A | * | 5/1999 | Abdo et al. | 208/108 |

FOREIGN PATENT DOCUMENTS

| | | | | |
|---|---|---|---|---|
| EP | 0 164 162 | 12/1985 | | B01J/23/85 |
| EP | 0 181 035 | 5/1986 | | B01J/23/88 |
| EP | 0 382 588 | 8/1990 | | B01J/37/16 |
| EP | 0 482 818 | 4/1992 | | C10G/45/08 |
| EP | 0 601 722 | 6/1994 | | C10G/45/08 |
| WO | WO 95/31260 | 11/1995 | | B01J/21/04 |
| WO | WO 96/41848 | 12/1996 | | C10G/45/08 |

OTHER PUBLICATIONS

*European Search Report*, dated Sep. 1, 1999.

* cited by examiner

*Primary Examiner*—Walter D. Griffin
(74) *Attorney, Agent, or Firm*—Louis A. Morris

(57) ABSTRACT

The invention pertains to a process for preparing a sulfided hydrotreating catalyst in which a hydrotreating catalyst is subjected to a sulfidation step, wherein the hydrotreating catalyst comprises a carrier comprising at least 50 wt % of alumina, the catalyst comprising at least one hydrogenation metal component and an organic compound comprising at least one covalently bonded nitrogen atom and at least one carbonyl moiety, the molar ratio between the organic compound and the total hydrogenation metal content being at least 0.01:1. The invention further pertains to the use of said hydrotreating catalyst in hydrotreating a hydrocarbon feed, in particular to achieve hydrodenitrogenation, (deep) hydrodesulfurization, or hydrodearomatization.

16 Claims, No Drawings

US 6,540,908 B1

PROCESS FOR SULFIDING A HYDROTREATING CATALYST COMPRISING AN ORGANIC COMPOUND COMPRISING N AND CARBONYL

CROSS REFERENCE TO RELATED APPLICATIONS

The present application claims priority of U.S. Provisional Patent Application No. 60/128,256, filed on Apr. 8, 1999 and European Patent Application Serial No. 99201051.2, filed on Apr. 8, 1999.

BACKGROUND OF THE INVENTION

1. Field of the Invention

The invention relates to a process for preparing a sulfided hydrotreating catalyst, and the use of said catalyst in hydrotreating a hydrocarbon feed.

2. Prior Art

In general, the object of catalytically hydrotreating hydrocarbon-containing feeds is the complete or partial removal of impurities. Common impurities are sulfur compounds and nitrogen compounds. At least the partial removal of such impurities from a feed will ensure that, when the final product is burnt, fewer sulfur oxides and/or nitrogen oxides harmful to the environment will be released. In addition, a reduced content of impurities leads to an improvement of the colour, smell, and stability of the final product. Further, sulfur compounds and nitrogen compounds are toxic to many of the catalysts employed in the oil industry for converting feeds into ready-for-use products. Examples of such catalysts include cracking catalysts, hydrocracking catalysts, and reforming catalysts. It is therefore customary for feeds to be subjected to a catalytic hydrotreatment prior to their being processed in, say, a cracking unit. Catalytic hydrotreatment implies contacting a feed with hydrogen at elevated temperature and pressure in the presence of a hydrotreating catalyst. In this process at least a portion of the sulfur compounds and the nitrogen compounds present in the feed is converted into readily removable hydrogensulfide and ammonia. This is commonly referred to as hydrodesulfurisation and hydrodenitrogenation, respectively.

In general, hydrotreating catalysts are composed of a carrier with a Group VIB metal component and a Group VIII non-noble metal component deposited thereon. The most commonly employed Group VIB metals are molybdenum and tungsten, while cobalt and nickel are the conventional Group VIII non-noble metals. Phosphorus may also be present in the catalyst. The prior art processes for preparing these catalysts are characterised in that a carrier is composited with hydrogenation metal components, for example by impregnation, after which the composite is calcined to convert the metal components into their oxides. Subsequently, the calcined catalysts generally are subjected to a sulfidation treatment.

Because the requirements as to the legally permitted sulfur and nitrogen contents in fuels are becoming ever stricter, there is a continuous need for hydrotreating catalysts with improved activity. Further, at a given final sulfur content of the fuel a more active catalyst will make it possible to operate under milder process conditions (energy saving) or to increase the life span of a catalyst between regenerations (cycle length) or to achieve higher throughput.

Various efforts have been made in the, art to provide hydrotreating catalysts with improved activity. A relatively new trend in this field is the use of organic compounds. For example, WO 95/31280 describes a process which comprises (i) wetting a catalyst composition comprising a hydrogenation metal by contact with an organic compound such as EDTA,
(ii) ageing the wetted substrate while wet,
(iii) drying the aged substrate, and
(iv) calcining the dried substrate.

It is explicitly disclosed in WO 95/31280 that the drying and calcination steps are carried but in such a way as to remove or decompose the entire amount of organic compound originally present in the hydrotreating catalyst. The resulting hydrotreating catalyst, which consequently does not contain any organic compound, is subsequently contacted with a feed to be hydrodesulfurised, and sulfided in the process.

EP 0164162 also deals with the use of organic compounds in catalyst preparation. However, as in the case of WO 95/31280, a calcination step subsequent to the incorporation of the organic compound into the carrier is described as essential.

WO 96/41848 and EP 0601722 describe processes for the preparation of organic compound-containing hydrotreating catalysts which are used, and thus sulfided, while containing the organic compound. A further reference in which the sulfidation of organic compound-containing hydrotreating catalysts is described is EP0181035.

Comparative Example 1 of EP 0 482 818 describes a catalyst consisting of analumina hydrate carrier containing 22 wt. % of molybdenum, calculated as trioxide, 4 wt. % of cobalt, calculated as oxide, 3 wt. % of phosphorus, calculated as $P_2O_5$, and EDTA in a molar amount of 0.6 times the total molar amount of the Group VI and Group VIII metals. This reference actually claims a method of making a catalyst composition comprising analumina hydrate, a Group VI metal, a Group VIII metal, and a hydroxycarboxylic acid, with the above-cited example merely being comparative.

SUMMARY OF THE INVENTION

In one embodiment, the present invention is a process for preparing a sulfided hydrotreating catalyst in which a hydrotreating catalyst is subjected to a sulfidation step. The hydrotreating catalyst comprises a carrier comprising at least 50 wt % of alumina. The catalyst also comprises at least one hydrogenation metal component and an organic compound comprising at least one covalently bonded nitrogen atom and at least one carbonyl moiety. The molar ratio between the organic compound and the total hydrogenation metal content is at least 0.01:1.

It is an important proviso to the above embodiment that the hydrotreating catalyst is not a catalyst consisting of an alumina hydrate carrier containing 22 wt. % of molybdenum, calculated as trioxide, 4 wt. % of cobalt, calculated as oxide, 3 wt. % of phosphorus, calculated as $P_2O_5$, and EDTA in a molar amount of 0.6 times the total molar amount of the Group VI and Group VIII metals. This proviso serves to distinguish that embodiment from the inadvertent disclosure of Comparative Example 1 of EP 0 482 818.

In a second embodiment, the present invention is a process for preparing a sulfided hydrotreating catalyst in which a hydrotreating catalyst is subjected to a sulfidation step. The hydrotreating catalyst comprises a carrier comprising at least 50 wt % of alumina, at least one hydrogenation metal component of Group VI, nickel as an additional hydrogenation metal component, and an organic compound comprising at least one covalently bonded nitrogen atom and at least one carbonyl moiety. The molar ratio between the organic compound and the total hydrogenation metal component content is at least 0.01:1.

In a third embodiment, the present invention is a process for preparing a sulfided hydrotreating catalyst in which a hydrotreating catalyst is subjected to an ex situ sulfidation step, wherein the hydrotreating catalyst comprises a carrier comprising at least 50wt % of alumina. The catalyst comprises at least one hydrogenation metal component and an organic compound comprising at least one covalently bonded nitrogen atom and at least one carbonyl moiety. The molar ratio between the organic compound and the total hydrogenation metal content is at least 0.01:1.

In a fourth embodiment, the present invention is a process for preparing a sulfided hydrotreating catalyst in which a hydrotreating catalyst is subjected to a sufidation step, wherein the hydrotreating catalyst comprises a carrier comprising at least 50 wt % of a transition alumina, at least one hydrogenation metal component and an organic compound comprising at least one covalently bonded nitrogen atom and at least one carbonyl moiety. The molar ratio between the organic compound and the total hydrogenation metal content is at least 0.01:1.

In a fifth embodiment, the present invention is a process for preparing a sufided hydrotreating catalyst in which a hydrotreating catalyst is subjected to a sulfidation step, wherein the hydrotreating catalyst comprises a carrier comprising at least 50 wt % of an alumina, at least one hydrogenation metal component and an organic compound comprising at least one covalently bonded nitrogen atom and at least one carbonyl moiety. The molar ratio between the organic compound and the total hydrogenation metal content is between 0.01:1 and 0.55:1.

Other embodiments of the invention encompass details about the sulfidation step, the organic compound composition, preparation of the catalyst, a process for hydrotreating a hydrocarbon feed wherein a hydrocarbon feed is contacted under hydrotreating conditions with the above-described hydrotreating catalyst, etc., all, of which are hereinafter disclosed in the following discussion of each of the facets of the present invention.

DETAILED DESCRIPTION OF THE INVENTION

The difference between the process of the present invention and that of WO 95/31280 or EP 0164162 resides in the fact that in those two references, the organic compound is removed from the hydrotreating catalyst by drying and calcination prior to sulfidation, whereas in the process of the present invention, the hydrotreating catalyst to be sulfided contains an organic compound in the above-specified amount. It has surprisingly been found that the sulfided catalyst of the present invention has an activity in hydrotreating which is equal to or even higher than that of the catalyst of WO 95/31280 or EP 0164162, while the omission of the calcination step makes for a simpler and cheaper process.

Both WO 96/41848 and EP 0601722 describe organic compounds which are completely different from the nitrogen and carbonyl-containing compounds used in the process of the present invention. EP0181035 is entirely directed to catalysts comprising a silica carrier, which are completely different from the catalyst of the present invention, the carrier of which contains at least 50 wt % of alumina.

In the context of the present specification, the term "sulfidation step" is meant to include any process step in which at least a portion of the hydrogenation metal components present in the catalyst is converted into the sulphidic form.

Suitable sulfidation processes are, known in the art. Commonly known sulfidation processes are ex-situ and in-situ sulfidation. Ex-situ sulfidation processes take place outside the reactor in which the catalyst is to be used in hydrotreating hydrocarbon feeds. In such a process the catalyst is contacted with a sulfur compound, e.g., a polysulfide or elemental sulfur, outside the reactor and, if necessary, dried. In a second step, the material is treated with hydrogen gas at elevated temperature in the reactor, optionally in the presence of a feed, to activate the catalyst, i.e. bring it into the sulfided state.

In-situ sulfidation processes take place in the reactor in which the catalyst is to be used in hydrotreating hydrocarbon feeds. Here, the catalyst is contacted in the reactor at elevated temperature with a hydrogen gas stream mixed with a sulfiding agent, such as hydrogen sulfide or a compound that under the prevailing conditions is decomposable into hydrogen sulfide. It is also possible to use a hydrogen gas stream combined with a hydrocarbon feed comprising a sulfur compound that under the prevailing conditions is decomposable into hydrogen sulfide. In the latter case it is possible to use a hydrocarbon feed comprising an added sulfiding agent (a so-called spiked feed), but it is also possible to use a sulfur-containing hydrocarbon feed without any added sulfiding agent, since the sulfur components present in the feed will be converted into hydrogen sulfide in the presence of the catalyst. The hydrocarbon feed can be the feed to be subjected to hydrodesulfurisation but it can also be a different feed, one which is later replaced with the feed to be subjected to hydrodesulfurization. Combinations of the various sulfidation techniques may also be applied. All of the above is known to the skilled person. At this point in time in situ presulfiding with an, optionally spiked, hydrocarbon feed is considered preferred.

The organic compound present in the hydrotreating catalyst of the present invention comprises at least one covalently bonded nitrogen atom and at least one carbonyl moiety. Examples include aminopolycarboxylic acids, such as nitrilo-triacetic acid, ethylenediamine(tetra)acetic acid (EDTA), and diethylene triamine pentaacetic acid. Preferably, the organic compound comprises at least two nitrogen atoms and preferably at least two carbonyl moieties. It is further preferred that at least one carbonyl moiety is present in a carboxyl group. It is furthermore preferred that at least one nitrogen atom is covalently, bonded to at least two carbon atoms. A preferred organic compound is a compound satisfying formula (I)

(R1R2)N—R3—N(R1'R2')  (I)

wherein R1, R2, R1' and R2' are independently selected from alkyl, alkenyl, and allyl with up to 10 carbon atoms optionally substituted with one or more groups selected from carbonyl, carboxyl, ester, ether, amino, oramido. R3 is an alkylene group with up to 10 carbon atoms which may be interrupted by —O— or —NR4—. R4 is selected from the same group as indicated above for R1. The R3 alkylene group may be substituted with one or more groups selected from carbonyl, carboxyl, ester, ether, amino, oramido. As has been set out above, it is essential that the organic compound of formula (I)comprises at least one carbonyl moiety.

Preferably, at least two of R1, R2, R1' and R2' have the formula —R5—COOX, wherein R5 is an alkylene group having 1–4 carbon atoms, and X is hydrogen or another cation, such as an ammonium, a sodium, a potassium, and/or a lithium cation. If X is a multivalent cation, one X can adhere to two or more —R5—COO groups. Typical examples of such a compound are ethylenediamine(tetra) acetic acid (EDTA), hydroxyethylenediaminetriacetic acid, and diethylenetriaminepentaacetic acid. It will be clear that the hydrotreating catalyst of invention may comprise a single organic compound as well as a combination of different organic compounds.

The carrier of the hydrotreating catalyst comprises at least 50 wt % of alumina. The alumina preferably comprises a transition alumina, for example an η-, θ-, or γ-alumina, with γ-alumina being the most preferred. The carrier may additionally contain further components such as conventional oxides, e.g., silica, silica-alumina, alumina with silica-alumina dispersed therein, silica-coated alumina, magnesia, zircon, boria, and titania, as well as mixtures of these oxides. The alumina preferably is present in the carrier in an amount of more than 80 wt % and more preferably in an amount of more than 85 wt % and even more preferably in an amount of more than 88 wt %, based on the total weight of the carrier. Still more preferred is a carrier containing more than 95 wt % of alumina. It is most preferred that the carrier consists substantially of alumina, preferably of a transition alumina.

The carrier can be prepared by processes known in the art, e.g, according to the following procedure:

A precursor for the alumina carrier is selected, e.g., in the form of an alumina hydrogel (boehmite). After the precursor has been dried or not, e.g., by means of spray-drying, the carrier generally is shaped into particles, for example by extrusion. The shaped particles generally are calcined at a temperature in the range of 400° to 850° C., resulting in a carrier comprising a transition alumina, e.g., a γ-, θ-, or η-alumina The hydrogenation metal contained in the hydrotreating catalyst preferably is a combination of a Group VIB metal and a Group VIII non-noble metal. Suitable Group VIB metals are, e.g., molybdenum, tungsten, and chromium. Suitable Group VII, non-noble metals include, e.g., nickel, cobalt, and iron. Especially preferred is a combination of nickel and/or cobalt with molybdenum and/or tungsten. If the hydrodesulfurisation activity of the catalyst is the more important, a combination of cobalt with molybdenum is advantageous. If the hydrodenitrogenation activity of the catalyst is the more important, a combination of nickel with molybdenum or tungsten is advantageous.

If so desired, other components, such as phosphorus, halogens, and boron, may be present in the catalyst.

The hydrotreating catalyst of the invention can be prepared by a process comprising the steps of:

1. compositing a catalyst carrier comprising at least 50 wt % of alumina with at least one hydrogenation metal component,
2. prior to, simultaneously with, or subsequent to said compositing with the hydrogenation metal component, compositing the catalyst carrier with the organic compound,
3. optionally drying the carrier comprising the hydrogenation metal component and the organic compound at a temperature sufficiently low to maintain a molar ratio of the organic compound to the total hydrogenation metal content of at least 0.01:1.

As described above, the carrier is composited with the organic compound prior to, subsequent to or simultaneously with the hydrogenation metal component. These three options will be described in more detail as alternatives (a), (b), and (c) below.

Alternative (a)

Alternative (a) refers to those cases where the carrier is first composited with the hydrogenation metal component and subsequently the resulting carrier is composited with, the organic compound: This can be done, e.g., by impregnating a carrier with a solution comprising one or more hydrogenation metal components in a first process step and optionally drying and/or calcining the thus obtained product at a temperature sufficient to convert the hydrogenation metal component into a stable oxide. In a second process step the thus obtained product is then composited with the organic compound. It is possible, e.g., to composite a conventional hydrotreating catalyst comprising a hydrogenation metal component on a carrier as defined above with the organic compound. The conventional hydrotreating catalyst used in this process can be either a freshly prepared hydrotreating catalyst or a used hydrotreating catalyst which has been regenerated.

Alternatively, one or more hydrogenation metal components can, e.g., be mixed wholly or in part with the carrier prior to a shaping step being carried out. In such an embodiment the hydrogenation metal component, or a portion thereof, can, e.g., be deposited on the not yet shaped carrier, say, a powder or a (hydro)gel, e.g., by means of impregnation or by mixing it in the solid form, after which the shaping step is carried out, e.g., by so-called (co) pelletisation or (co)extrusion. If the hydrogenation metal components are to be composited with the carrier before the shaping step, it is recommended that the Group VIB metal component employed in this process be molybdenum trioxide. After an optional calcination step applied to the shaped particles, they are composited with the organic compound. As will be explained in more detail below, it is generally preferred to carry out a calcination step, to convert at least part of the alumina into transition alumina.

Compositing with the organic compound can be carried out, e.g., by impregnating the carrier with a suitable amount of an impregnation solution comprising the organic compound in an appropriate solvent. This can be done, e.g., by equilibrium/soak impregnation or by pore volume impregnation, which is well known in the art. In this technique, the total volume of the impregnation solution is selected to be in the range of the total pore volume of the carrier to be impregnated. The carrier and a suitable amount of the impregnation solution are mixed until virtually all of the impregnation solution is taken up in the carrier.

The solvent used in preparing the impregnation solution containing the organic compound generally is water, although other compounds, such as methanol, ethanol, and other alcohols, may also be suitable, depending on the nature of the organic compound. If the nature of the organic compound lends itself to this, the use of.a solvent is, in principle, not necessary. This goes, e.g., for compounds that are liquid at room temperature.

Alternative (b)

Alternative (b) refers to those cases where the carrier is first composited with the organic compound and subsequently the carrier comprising the organic compound is composited with the hydrogenation metal component by the techniques described above. Optionally, the organic compound can be composited with the carrier as defined above, prior to a shaping step being carried out. The obtained product is shaped and subsequently composited with the hydrogenation metal component by the techniques described above. At this point in time it is considered preferred in this embodiment to composite a shaped, transition alumina-containing, carrier with the organic compound and subsequently with the hydrogenation metals.

Alternative (c)

Alterative (c) refers to those cases where the carrier is composited simultaneously with the organic compound and the hydrogenation metal component. This can be done, e.g., by compositing the carrier with an aqueous solution comprising suitable amounts of the hydrogenation metal component and the organic compound. However, though at this point in time less preferred, it is also possible, e.g., to composite the carrier as defined above prior to a shaping step being carried out with, e.g., an aqueous solution comprising suitable amounts of the hydrogenation metal component and the organic compound or with all compounds in the form of solids.

It is noted that, as indicated above, it is preferred for the catalyst carrier to comprise a transition alumina, such as an η-, θ-, or γ-alumina, with γ-alumina being the most preferred. This means that if an alumina hydrate such as boehmite is used as starting material, the carrier is preferably subjected to a calcination step to convert at least part of the alumina hydrate into a transition alumina. The calcination step is generally carried out at a temperature of 400–850° C. for a period of 0.5–6 hours. Since this calcination step will remove any additive, it will be evident that in this case the additive should be incorporated into the catalyst composition only after the transition alumina is formed. Thus, it is preferred to prepare the catalyst by way of a process in which in a first step a carrier comprising a transition alumina is prepared, generally in the form of shaped particles, after which in a second step the additive is composited with the carrier. The hydrogenation metals can be incorporated into the catalyst in any way, including mixing through the alumina precursor before shaping and, calcining to produce the transition alumina, and impregnation of the transition-alumina containing carrier, either prior to, simultaneously with or subsequent to the incorporation of the additive.

Instead of impregnating techniques in the above-described process alternatives there may be used, e.g., dipping methods, spraying methods, etc., with impregnation, such as pore volume impregnation, being preferred. Further; as mentioned above, depending on the nature of the organic compound, it is possible to composite the carrier with the hydrogenation metal component and the organic compound as such, i.e. without using a solvent.

In all the above-described process alternatives, the hydrogenation metal components preferably are applied in an amount of 0.1 to 50 wt %, calculated as their respective oxides. If the hydrogenation metal components comprise components of Group VIB and Group VIII non-noble metals, they preferably are applied in amounts of 5–50 wt %, preferably 5–30 wt. % and 1–15 wt. %, preferably 1–10 wt %, calculated as trioxide and monoxide, respectively. The metals contents are calculated on the catalyst as dry base, that is, after heating from 1 hour at 600° C. in air.

As has been stated above, it is preferred to incorporate the organic compound into the carrier via an impregnation technique. In this case, the proper selection of a suitable amount of organic compound to be used in the preparation of the hydrotreating catalyst is regulated as follows: an important factor in deciding both the suitability of an organic compound as such and the amount of organic compound to be used is the viscosity of the impregnation solution containing the organic compound. To obtain a high catalytic activity, the organic compound must be distributed homogeneously over the catalyst. If the impregnation solution is too viscous, the impregnation step will not result in a homogeneous distribution of the organic compound over the catalyst. Depending on the nature of the organic compound, the appropriate amount of organic compound preferably lies in the range of 0.05–2.5 moles of organic compound per mole of the total of hydrogenation metals present in the catalyst. If the amount of organic compound added is too low, the advantageous effect of the invention will not be obtained. On the other hand, the addition of an exceptionally large amount of organic compound will not improve the effect of the invention. On the contrary, besides being a waste of material, the addition of a higher amount of organic compound than is necessary results in a large quantity of organic materials being present in the catalyst, which may lead to detrimental coke formation or the formation of undesired decomposition products when the catalyst is sulfided and/or used. Further, as has been explained before, the use of a large quantity :of organic compound may increase the viscosity of the impregnation solution to an unacceptable value.

As will be clear to the person skilled in the art, the exact amount of organic compound to be used in a specific situation, and the upper and lower limits for these ranges, will depend upon a variety of parameters including the metals content of the catalyst, the pore volume and pore size distribution of the catalyst, the nature of the organic compound, the solvent to be used in the impregnation solution, the impregnation conditions, etc. It is well within the scope of the person skilled in the art to determine the optimum amount of organic compound to be used in each specific situation, taking the above-mentioned variables into account.

Suitable other compounds to be incorporated into the carrier in the above-described process are, e.g., compounds comprising phosphorus, boron, or halogens. Particularly, the incorporation of phosphorus in an amount of 0.1–10 wt %, calculated as $P_2O_5$, based on the weight of the catalyst, to improve the hydrodenitrogenation activity of the catalyst is preferred. Suitable phosphorus compounds include phosphoric acid and the various ammonium hydrogen phosphates. Phosphorus-containing compounds can, e.g., be incorporated into the carrier by, e.g., applying in the impregnation step an impregnation solution which additionally comprises phosphorus-containing compounds.

It is possible for the catalyst comprising the carrier, the organic compound, and the hydrogenation metal component to be aged after the carrier has been composited with the organic compound and the hydrogenation metal component and, if drying is necessary, before the drying step. However, at this point in time ageing is not preferred, since it makes the process more complicated while it does not seem to result in an increase in activity.

The ageing time applied in the ageing step, if applied, is a function of temperature. Generally, the ageing time decreases with increasing ageing temperature. Preferably, the ageing of the resulting catalyst comprising the carrier, the hydrogenation metal component, and the organic compound is carried out at a temperature between 0° and 50° C. for a period of over 4 hours, or at a temperature above 50° C. for a period of over 3 hours. In an alternative embodiment, the resulting catalyst comprising the carrier, the hydrogenation metal component, and the organic compound is aged at a temperature of above 100° C. under hydrothermal conditions (that is, at such pressure that water still in the liquid phase) for a period of over 15 minutes. Alternatively, the step of ageing the resulting catalyst comprising the carrier, the hydrogenation metal component, and the organic compound is effected by heating with microwaves. On the other hand, it is also possible, e.g., to effect the step of ageing the resulting catalyst comprising the carrier, the hydrogenation metal component, and the organic compound by heating using induction heating.

If necessary, the optionally aged catalyst is dried to remove the solvent. If a drying step is carried out, it must be effected at a temperature sufficiently low to maintain a molar ratio of the total organic compound content to the total hydrogenation metal content of at least 0.01:1, preferably at least 0.05:1, and even more preferably of at least 0.1:1 in the resulting hydrotreating catalyst. It may be preferred for the molar ratio to be at most 0.55:1, especially for catalysts with a pore volume below 0.65 ml/g.

In consequence, the drying conditions to be applied depend heavily on the temperature at which the organic compound present in the catalyst boils or decomposes. It is preferred to keep as much organic compound as possible in the catalyst during the drying step, but with the more volatile organic compounds the evaporation of these organic compounds during the drying step cannot always be avoided. Thus the drying step may be carried out in air, under vacuum, or in inert gas. Generally, it is advantageous to have a drying temperature below 220° C., although a lower temperature may be necessary, depending on the nature of the organic compound present in the catalyst. Temperature ranges of 80°–150° C. will generally be preferred.

It will be clear that, if the preparation process comprises further process steps apart from the above-described steps, care must be taken that no process step is applied which reduces the molar ratio between the organic compound and the total hydrogenation metal content in the resulting hydrotreating catalyst to below the above-specified value. For example, subsequent to compositing the carrier with the organic compound and prior to sulfidation of the resulting hydrotreating catalyst, no conventional calcination shall be carried out, as such a calcination would remove the entire amount of organic compound, as is the case in the process of WO 95/31280 or EP 0164162. The calcination step of these references can be dispensed with in the process of the present invention, which is highly favorable economically.

Hydrotreating process

The invention also pertains to a process for hydrotreating a hydrocarbon feed wherein a hydrocarbon feed is contacted under hydrotreating conditions with the above-described hydrotreating catalyst.

The hydrotreating generally takes place under conventional hydrotreating conditions, such as temperatures in the range of 250°–450° C., pressures in the range of 5–250 bar, space velocities in the range of 0,1–10 h$^{-1}$, and H$_2$/oil ratios in the range of 50–2000Nl/l. Examples of suitable feeds include middle distillates, kerosine, naphtha, vacuum gas oils, and heavy gas oils. Preferably, the hydrocarbon feed contains at least 0.2 wt % of sulfur, calculated as atomic sulfur S. Preferred hydrotreating reactions are (deep) hydrodesulfurisation, hydrodenitrogenation, and hydrodearomatisation.

The invention is illustrated by way of the following Example:

EXAMPLE

Catalyst 1 according to the invention was prepared as follows. A conventional hydrotreating catalyst containing 26 wt. % molybdenum, calculated as trioxide, 4.7 wt. % nickel, calculated as oxide, and 6.7 wt % phosphorus, calculated as P$_2$O$_5$, on a gamma-alumina carrier was impregnated by pore volume impregnation with a diammonium EDTA solution, containing 0.11 mole EDTA per mole of the total, of molybdenum and nickel. The catalyst was aged for three days at 75° C. in a closed container. After aging, the catalyst was dried rotating with hot air to a product temperature of 130° C.

Catalyst 2 according to the invention was prepared in the same way as Catalyst 1, except that it was not aged but dried 1.5hours after the EDTA impregnation.

Comparative Catalyst 1 was prepared in the same way as Catalyst 1, except after the aging step, the catalyst was calcined for 2 hours at a temperature of 454° C. This catalyst is in accordance with the teaching of WO 95,31280.

The catalysts were tested in an upflow tubular reactor. Each reactor tube contained 75 ml of catalyst homogeneously intermixed with 70 ml of carborundum particles.

The catalysts were sulfided using an SRGO in which dimethyl disulfide had been dissolved to a total S content of 2.5 wt. % (LHSV=4.0, H$_2$/oil=120nl/l, P=30 bar, T=320° C.).

After the sulfidation was completed, the feed was switched to VGO and the reaction conditions were adjusted. The properties of the VGO feedstock are given in table 1 below. The reaction conditions are given in table 2 below.

TABLE 1 feedstock properties

| Type feed | Vacuum gas oil |
|---|---|
| Nitrogen (ASTM D-4629) (ppmwt) | 1271 |
| Sulfur (ASTM D-4294) (wt. %) | 1.29 |
| Density 15° C. (g/ml) | 0.9217 |
| Dist. (° C.) (ASTM D 1160) | |
| IBP | 259 |
| 5 vol. % | 326 |
| 10 vol. % | 358 |
| 30 vol. % | 415 |
| 50 vol. % | 450 |
| 70 vol. % | 485 |
| 90 vol. % | 536 |
| 95 vol. % | 559 |
| FBP | 587 |

TABLE 2

Reaction conditions

| Temperature (° C.) | 360 |
|---|---|
| Pressure (bar) | 70 |
| H$_2$/oil (Nl/l) | 400 |
| LHSV (h-1) | 1.2 |

The oil product from the reactor was analysed, and the relative volume activities of the catalysts for hydrodenitrogenation were calculated, with the activity of Comparative Catalyst 1being set at 100. The results are given in Table 3 below.

TABLE 3 test results

| | Catalyst 1 | Catalyst 2 | Comparative Catalyst 1 |
|---|---|---|---|
| RVA HDN | 103 | 118 | 100 |

This shows that Catalyst 1, which was prepared without a calcination step, is as good as Comparative Catalyst 1. This makes it possible to dispense with the calcination, step without losing activity. Catalyst 2, which was prepared without a calcination step and without an ageing step shows even better results than the other catalysts. Apparently, a simpler catalyst preparation process can lead to a catalyst with increased activity.

What is claimed is:

1. A process for preparing a sulfided hydrotreating catalyst comprising the steps of:
    a). compositing a catalyst carrier comprising at least 50 wt % of alumina with at least one hydrogenation metal component;
    b). combining the product of step a. with an organic compound comprising at least one covalently bonded nitrogen atom and at least one carbonyl moiety, the molar ratio between the organic compound and the total hydrogenation metal content being at least 0.01:1, and
    c). sulfiding the product of step b.

2. The process of claim 1 wherein the organic compound comprises at least two nitrogen atoms and at least two carbonyl moieties.

3. The process of claim 1 wherein at least one carbonyl moiety is present in a carboxyl group.

4. The process of claim 1 wherein at least one nitrogen atom is covalently bonded to at least two carbon atoms.

5. The process of claim 1 wherein the organic compound is of formula (I)

(R1R2)N—R3—N(R1'R2')    (I)

wherein R1, R2, R1' and R2' are independently selected from alkyl, alkenyl, and allyl with up to 10 carbon atoms optionally substituted with one or more groups selected from carbonyl, carboxyl, ester, ether, amino, or amido, and R3 is an alkylene group with up to 10 carbon atoms which may be interrupted by —O— or —NR4-, R4 being selected from the same group as indicated above for R1, which R3 alkylene group may be substituted with one or more groups selected from carbonyl, carboxyl, ester, ether, amino, or amido, with the proviso that the organic compound of formula (I) comprises at least one carbonyl moiety.

6. The process of claim 5 wherein at least two of R1, R2, R1' and R2' have the formula —R5—COOX, wherein R5 is an alkylene group having 1–4 carbon atoms, and X is hydrogen or another cation, where if X is a multivalent cation, one X can adhere to two or more —R5—COO groups.

7. The process of claimed 1 wherein the sulfidation is carried out ex-situ.

8. The process of claim 1 wherein the sulfidation is carried out in-situ with an optionally spiked hydrocarbon feed.

9. The process of claim 1 wherein the carrier comprising the hydrogenation metal component and the organic compound is dried at a temperature sufficiently low to maintain a ratio of the organic compound to the total hydrogenation metal content of at least 0.01:1.

10. The process of claim 1 wherein the alumina comprises a transition alumina.

11. A process for hydrotreating a hydrocarbon feed wherein a hydrocarbon feed is contacted under hydrotreating conditions with a catalyst obtained by the process of claim 1.

12. The process of claim 11 wherein the hydrocarbon feed contains at least 0.2 wt % of sulfur, calculated as S.

13. The process of claim 1 wherein the molar ratio between the organic compound and the total hydrogenation metal content is between 0.01:1 and 0.55:1.

14. The process of claim 1 wherein the composite of step a. is calcined prior to step b.

15. The process of claim 14 wherein the calcination step is carried out at a temperature of from about 400 to about 850° C.

16. The process of claim 1 wherein hydrogenation metal components comprise at least one hydrogenation metal component of Group VI and nickel.

* * * * *